United States Patent [19]

Schweitzer

[11] 4,370,427

[45] Jan. 25, 1983

[54] ALKYLATED ISOADIPOGUANAMINE-FORMALDEHYDE CROSSLINKING RESIN AND IMPROVED COATING COMPOSITIONS PRODUCED THEREFROM

[75] Inventor: Francis E. Schweitzer, Philadelphia, Pa.

[73] Assignee: E. I. Du Pont de Nemours and Company, Wilmington, Del.

[21] Appl. No.: 316,110

[22] Filed: Oct. 29, 1981

Related U.S. Application Data

[62] Division of Ser. No. 176,551, Aug. 8, 1980.

[51] Int. Cl.$^3$ .................. C08L 33/02; C08L 63/02; C08L 67/02; C08L 67/08
[52] U.S. Cl. ......................... 523/400; 524/512; 524/539; 524/542; 525/162; 525/163; 525/443; 525/510
[58] Field of Search ............. 525/162, 163, 443, 510; 524/512, 539, 542; 523/400

[56] References Cited

U.S. PATENT DOCUMENTS

| | | | |
|---|---|---|---|
| 3,288,902 | 11/1966 | Schuller et al. | 264/300 |
| 3,394,091 | 7/1968 | Kropa et al. | 524/35 |
| 3,428,585 | 2/1969 | Schuller et al. | 528/258 |
| 3,557,059 | 1/1971 | Hattori et al. | 528/258 |
| 4,163,835 | 8/1979 | Piesch | 528/254 |
| 4,262,033 | 4/1981 | Massy et al. | 528/258 |

FOREIGN PATENT DOCUMENTS

| | | | |
|---|---|---|---|
| 556314 | 11/1958 | Canada | 528/258 |
| 48-1833 | 1/1973 | Japan. | |
| 608186 | 9/1948 | United Kingdom. | |

*Primary Examiner*—Wilbert J. Briggs, Sr.
*Attorney, Agent, or Firm*—William H. Thrower

[57] ABSTRACT

A thermosetting synthetic crosslinking resin containing selected ethers of the reaction product of an isoadipoguanamine mixture and formaldehyde can be incorporated into a variety of coating compositions to provide finishes that are characterized by hardness, flexibility, durability, excellent adhesion, and commercially-acceptable cure temperatures.

9 Claims, No Drawings

ALKYLATED ISOADIPOGUANAMINE-FORMALDEHYDE CROSSLINKING RESIN AND IMPROVED COATING COMPOSITIONS PRODUCED THEREFROM

This application is a division of prior U.S. application Ser. No. 176,551, filed Aug. 8, 1980.

BACKGROUND OF THE INVENTION

Conventional nitrogenous thermosetting crosslinking resins, or aminoplasts, are widely used in the coatings industry. Urea, melamine, substituted guanamine, and related triazines have each been the subject of much effort in the search for improved crosslinking resins. Such resins are formed by reacting the selected amine or amide with formaldehyde to form methylol groups which may or may not be temporarily blocked against excessive condensation by etherification with one of the lower alcohols. As a class, these resins are characterized by their ability to form hard, durable films under the influence of heat and/or suitable catalysts and are considered to be relatively rapid-curing.

It is often necessary, when formulating aminoplast crosslinking resins, to sacrifice one desired property in order to attain or enhance another. For example, melamine-formaldehyde resins are noted for their excellent color retention, hardness, and resistance to hydrolytic, caustic, detergent, or salt spray breakdown. Although benzoguanamine-formaldehyde resins surpass the melamine resins in imparting flexibility and chemical resistance, they are often severely deficient in exterior durability. Urea-formaldehyde resins promote superior intercoat adhesion, but their color and gloss retention are poorer than that of melamine resins.

As the search for new and improved aminoplast resins continues, emphasis will be placed on the overall balance of properties possessed by these resins, as well as on commercial availability and cost.

SUMMARY OF THE INVENTION

There is provided by the present invention a thermosetting crosslinking resins consisting essentially of the reaction product of:

(1) an isoadipoguanamine mixture consisting essentially of:
 (a) about 87-95 percent by weight, based on the weight of the isoadipoguanamine mixture, of 2-methylglutaroguanamine,
 (b) about 4-12 percent by weight, based on the weight of the isoadipoguanamine mixture, of 2-ethylsuccinoguanamine, and
 (c) about 1-2 percent by weight, based on the weight of the isoadipoguanamine mixture, of adipoguanamine;

(2) from 3-6 moles of formaldehyde per mole of said isoadipoguanamine mixture; and (3) a stoichiometric excess of an aliphatic alcohol having 1-4 carbon atoms or a mixture of such alcohols.

DETAILED DESCRIPTION OF THE INVENTION

The alkylated isoadipoguanamine-formaldehyde crosslinking resins of the present invention, when reacted with any of a variety of other polymeric systems having complementary functional reactivity, provide useful finishes for appliances, automobiles, steel furniture, or general industrial use. These finishes cure at commercially-acceptable temperatures, and are characterized by an unexpected combination of beneficial properties heretofore unobtainable in any given crosslinking resin, viz., hardness, flexibility, resistance to chemicals and outdoor weathering, and excellent adhesion. Furthermore, the resins of the present invention are most attractive from a commercial standpoint because the starting material for the isoadipoguanamine mixture can be derived from the by-product, or waste stream, of a commercial manufacturing process.

This commercial process, for the manufacture of adiponitrile, employs methods well known in the art and results in the formation of a mixed dinitrile by-product containing primarily 2-methylglutaronitrile and 2-ethylsuccinonitrile. The composition of this by-product may vary, but a typical composition is 82-88 percent by weight, based on the weight of the by-product, of 2-methylglutaronitrile, 10-15 percent by weight of 2-ethylsuccinonitrile, 2-5 percent by weight of adiponitrile, and 2-5 percent by weight of cresol. These nitriles can be converted to their corresponding guanamines by reaction with dicyanidiamide, again using methods well known in the art.

The mixture obtained from the aforementioned reaction contains primarily 2-methylglutaroguanamine, and small amounts of 2-ethylsuccinoguanamine and adipoguanamine. Typically, the composition of the mixture, hereinafter referred to as an isoadipoguanamine mixture, is 87-95 percent by weight, based on the weight of the mixture, of 2-methylglutaroguanamine, 4-12 percent by weight of 2-ethylsuccinoguanamine, and 1-2 percent by weight of adipoguanamine. The isoadipoguanamine mixture, then, can be represented by the formula

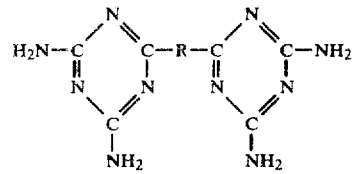

where R is selected from the group consisting of isobutylene, sec-butylene, and n-butylene.

In order to form the crosslinking resin of the present invention, this isoadipoguanamine mixture is reacted with formaldehyde to form methylol groups. These methylol groups exhibit a strong tendency to condense and form ether linkages, leading to the progressive development of linear, branched, and ring structures. It is necessary to arrest this condensation, and the concomitant loss of water solubility and increase in viscosity, by blocking the reactivity of the methylol groups by etherification with one of the lower aliphatic alcohols.

Ordinarily, some condensation takes place concurrently with etherification, although it is possible to control reaction conditions so as to obtain a totally alkylated crosslinker. The amount of condensation and etherification which occurs is largely pH-dependent and can be varied depending upon the properties ultimately desired in the coating composition. Methods for preparing alkylated aminoplast resins are well known in the art, and the method for preparing the particular crosslinking resin of the present invention is more fully detailed in Example 1, infra.

From 3 to 6, preferably 3 to 4, moles of formaldehyde per mole of isoadipoguanamine mixture, and an excess of a $C_1$-$C_4$ aliphatic alcohol are used in the reaction. Straight-chain alcohols, particularly n-butanol and methanol, are preferred. Mixtures of $C_1$-$C_4$ aliphatic alcohols, e.g., of methanol and n-butanol, may also be used.

Desired end properties of the coating composition will, to some extent, influence the type and amount of alcohol to be employed in etherification. The present invention encompasses an entire family of alkylated isoadipoguanamine-formaldehyde resins, ranging from stable water-soluble methanol ethers to stable organo-soluble higher alkyl ethers, from which an appropriate crosslinker for a given system may be selected. Any conventional hydroxyl- or carboxyl-functional film-forming material, e.g., acrylic resins, polyester or alkyd resins, epoxy resins, or mixtures thereof, can be crosslinked with these alkylated isoadipoguanamineformaldehyde resins.

A typical coating composition will contain about 60-80 percent, preferably about 70 percent, by weight of the hydroxyl- or carboxyl-functional film-forming material and about 20-40 percent, preferably about 30 percent, by weight of the isoadipoguanamine crosslinker. These percentages are based on the total weight of the binder constituents, i.e., of film-forming material plus crosslinker.

Preferred film-forming materials include hydroxyl-functional polyesters, hydroxyl- or carboxyl-functional acrylic polymers, and epoxy resins derived from epichlorohydrin and bisphenol-A. High solids coating compositions, wherein the solvent for the binder is present in an amount of no more than 100 percent by weight of the binder, can be prepared using the crosslinker of this invention and may, because of environmental considerations, become an extremely important application of this invention.

A highly preferred high solids polyester coating composition employs the alkylated isoadipoquanamine-formaldehyde resin to crosslink a film-forming material which consists essentially of:

(1) a polyester polyol that is the reaction product of
  (a) neopentyl glycol and at least one other hindered diol containing two methylol groups wherein each methylol group is attached directly to a cycloaliphatic or aromatic structure or to a tertiary carbon atom, the molar ratio of neopentyl glycol to hindered diol being 2:1 to 6:1, and
  (b) a mixture of an aromatic and an aliphatic dicarboxylic acid wherein the molar ratio of aromatic acid to aliphatic acid is from 2:1 to 10:1,
wherein the molar ratio of (a) to (b) is from 1.3:1 to 1.9:1 and wherein the polyol has a hydroxyl content of about 3.0–10.0% by weight; and (2) 0–50% by weight, based on the weight of (1), of an epichlorohydrin-bisphenol-A epoxy resin, or the esterification product of said resin with a monocarboxylic acid, or mixtures of these.

Coating compositions containing the crosslinker of this invention may be pigmented. Useful pigments are, for example, metal oxides, metal hydroxides, sulfides, sulfates, carbonates, silica, metal flakes, and organic dyes. Ordinarily, pigments are present in the amount of about 0.1–60 percent by weight, based on the total weight of the coating composition.

The coating compositions may further contain, as a durability enhancer, an ultraviolet light stabilizer, an antioxidant, or both. The ultraviolet light stabilizer can be present in an amount of 1–20% by weight, based on the weight of the binder constituents; the antioxidant can be present in an amount of 0.1–5% by weight, based on the weight of the binder constituents. Typical ultraviolet light stabilizers include benzophenones, triazoles, triazines, benzotriazoles, benzoates, lower alkyl thiomethylene-containing phenols, substituted benzenes, organophosphorous sulfides, substituted methylene malonitriles, hindered amines, and nickel compounds. A combination of a hindered amine light stabilizer and 2-(o-hydroxyphenyl)benzotriazole is particularly recommended. Typical antioxidants include tetrakis alkylene (dialkylhydroxyaryl)alkyl ester alkanes, of which a favorite is tetrakis methylene-3-(3',5'-dibutyl-4'-hydroxyphenyl)propionate methane.

Coating compositions containing an isoadipoguanamine crosslinker can be applied to a variety of substrates by any of the conventional application methods such as spraying, dipping, brushing, or flow coating. Substrates that can be advantageously coated with the present composition are, for example, metal, steel, wood, glass, or plastics such as polypropylene, polystyrene, copolymers of styrene, and the like.

The coating composition can be cured by baking at 105°-210° C. for 10 to 60 minutes. The baking temperature will vary, depending upon, inter alia, the particular alcohol used in etherification. Ethers of higher alcohols, being more stable, increase the threshold temperature at which the methylol group becomes unblocked to exercise its potential reactivity. Thus, coating compositions containing butylated isoadipoguanamine-formaldehyde resins will require baking at a higher temperature than will their methylated counterparts.

It is also possible to apply coating compositions containing an isoadipoguanamine crosslinker as a two-coat system wherein a first, pigmented coat is applied to the substrate as previously described, allowed to cure to a point where it is tack-free, and then overlaid with a second, unpigmented coat. This can impart added gloss to the finish, and is especially desirable when the compositions are to be used for automotive finishes.

The present invention will be more fully understood from the following illustrative examples, wherein all quantities, percentages, and ratios are on a weight basis unless otherwise indicated.

EXAMPLE 1

| Preparation of Butylated Isoadipoguanamine-Formaldehyde Resin | Parts by Weight |
| --- | --- |
| Formaldehyde solution (50% in water) | 332.3 |
| n-Butyl alcohol | 597.3 |
| Caustic sodium hydroxide solution (4.0% in water) | 4.8 |
| Formic acid solution (4.6% in water) | 8.3 |
| Monosodium phosphate monohydrate | 0.4 |
| Isoadipoguanamine mixture (93% 2-methylglutaroguanamine, 6% 2-ethylsuccinoguanamine, and 1% adipoguanamine) | 261.3 |
| Total | 1204.4 |

The formaldehyde solution is charged into a standard stainless steel direct-agitated kettle equipped with a vapor riser and parallel downflow condenser. The n-butyl alcohol and sodium hydroxide solution are added, and the batch is thoroughly mixed. The batch is then adjusted to a pH of 5.1 to 5.5 with the formic acid solution. Both the monosodium phosphate and the isoadipoguanamine mixture are added, in turn, while the mixing continues. The batch is heated to 80° C. for 1 to 4 hours, until complete solution is effected, and then is heated to reflux. The batch is held on total reflux for 30 minutes, after which time water take-off is begun. The water take-off schedule is as follows: after 1 hour, 4.37%; after 2 hours, 8.74%; after 3 hours, 13.11%; after 4 hours, 16.70%; between 4¼ and 5 hours, 17.55%. At least 17.55% of the water must be taken off, even if a longer distillation time is required. The end temperature is 112°-113° C. Next, 11.90% of n-butyl alcohol is taken off in 50 to 60 minutes. The batch is pumped out and filtered. After being cooled to 70° C. or below, the batch is thinned with n-butyl alcohol (approximately 13.9 parts) to 66% solids.

The resin thus prepared can be crosslinked with various other polymeric systems having complementary functional reactivity to form hard, durable, chemical-resistant finishes.

EXAMPLE 2

| Preparation of Alkyd Resin Coating Composition with Butylated Isoadipoguanamine-Formaldehyde Resin | Parts by Weight |
|---|---|
| Portion 1 | |
| Dehydrated castor oil alkyd resin (56% solids solution of dehydrated castor oil, glycerol phthalate, and glycerine in a solvent of V.M.&P. naphtha, anhydrous alcohol, and toluene) | 27.7 |
| Wax dispersion (12% low molecular weight polyethylene in solution of dehydrated castor oil alkyd in butanol and hydrocarbons) | 70.4 |
| Silicone solution (2% solution of linear and cyclic methyl siloxanes in xylol) | 3.0 |
| Inhibitor solution (10% solution of mixture of guaiacol and o-substituted phenols in aliphatic hydrocarbons) | 4.0 |
| Butylated isoadipoguanamine-formaldehyde resin (as prepared in Example 1) | 131.3 |
| Wax dispersion (Candelilla wax in solution of butylated urea-formaldehyde resin in excess butanol) | 10.1 |
| Flatting dispersion (34% diatomatious earth dispersion in solution of soybean oil alkyd in hydrocarbons) | 272.6 |
| Portion 2 | |
| Pigment dispersion (6% high-color furnace-black alkyd resin dispersion in butylated urea-formaldehyde resin solution in butanol and hydrocarbons) | 264.7 |
| Portion 3 | |
| Epoxy resin solution (liquid condensation polymer of epichlorohydrin and bisphenol-A and 2,2'-bis(n-hydroxyphenyl)propane in a solvent of toluene and n-butyl alcohol) | 41.1 |
| Portion 4 | |
| Hydrocarbon solvent (slow evaporation high solvency hydrocarbon with a distillation range of 182-219°) | 10.1 |
| Total | 835.0 |

The components of Portion 1 are added in order, with mixing, to a stainless steel vessel and mixed for 15 minutes. Portion 2 is added and the mixing is continued for 10 more minutes, after which Portion 3 is added, followed by another 10 minutes of mixing. Finally, Portion 4 is mixed in, and the solution is adjusted, if necessary, to the desired viscosity.

The resultant coating composition is sprayed onto "Bonderite 1000" panels, cold rolled steel panels which have been treated with iron phosphate. The coated panels are baked for 10 minutes at 350° F.

The coated panels thus prepared are compared to panels coated with compositions containing either a butylated melamine-formaldehyde crosslinker or a butylated benzoguanamine-formaldehyde crosslinker. The melamine and benzoguanamine crosslinking resins are prepared in the same manner as the isoadipoguanamine crosslinker, and are then substituted for the isoadipoguanamine crosslinker in the alkyd resin of this example. Standard bump and bend tests are conducted, and reveal the coatings containing the isoadipoguanamine crosslinker to be slightly superior to those containing melamine or benzoguanamine crosslinkers. The methyl ethyl ketone rub test shows that the isoadipoguanamine-containing coating cures more rapidly than the benzoguanamine-containing coating, and at least as rapidly as the melamine-containing coating. The gloss and color retention of the isoadipoguanamine panel, upon overbake, is equivalent to that of the melamine panel, and better than that of the benzoguanamine panel. In addition, the isoadipoguanamine panel exhibits excellent hardness, water resistance, solvent resistance, and scratch and mar resistance.

It should also be possible to produce high-quality finishes that will comply with proposed solvent emission regulations by incorporating the crosslinking resin of the present invention into coating compositions that can be applied at relatively high solids levels, as illustrated by the following example.

EXAMPLE 3

| Preparation of High-Solids Polyester Coating Composition with Butylated Isoadipoguanamine-Formaldehyde Crosslinker | | |
|---|---|---|
| I. Preparation of Polyester Polyol Solution | | Parts by Weight |
| Portion 1 | | |
| Monoester of neopentyl glycol and hydroxypivalic acid | | 65.3 |
| Neopentyl glycol | | 133.1 |
| Phthalic anhydride | | 59.2 |
| Isophthalic acid | | 66.4 |
| Adipic acid | | 29.2 |
| Dibutyl tin oxide | | 0.3 |
| Xylene | | 3.2 |
| Portion 2 | | |
| Xylene | | 7.8 |
| Portion 3 | | |
| 2-Ethyl hexanol | | 20.3 |
| | Total | 384.8 |

Charge Portion 1 into a reaction vessel equipped with an agitator and vapor condenser, and heat to reflux, approximately 210° C. Maintain this temperature until the reaction is completed. Monitor the flow of the water of esterification from the condenser and conduct intermittent sampling to determine when the acid number reaches 5, signifying completion of the reaction. Add Portion 2, allow the mixture to cool to about 125° C., and add Portion 3. Agitate and filter the mixture.

| II. | Preparation of Mill Base | Parts by Weight |
|---|---|---|
| | Polyester polyol solution (prepared above) | 34.5 |
| | Amyl acetate | 18.0 |
| | Pigment dispersion (copolymer of methyl methacrylate and 2-ethylhexyl acrylate in a solvent of toluene, methyl isobutyl ketone, and methyl ethyl ketone) | 3.0 |
| | TiO$_2$ white pigment | 100.0 |
| | Total | 155.5 |

Combine the above constituents in a mixing vessel and mix for about 1 hour. Then charge the mixture into a sand mill and grind at a temperature of about 35° C.

| III. | Preparation of the Coating Composition | Parts by Weight |
|---|---|---|
| | Portion 1 | |
| | Polyester polyol solution (prepared above) | 40.2 |
| | Epichlorohydrin-bisphenol-A (60% solution in methyl ethyl ketone and xylene) | 8.3 |
| | Mill base (prepared above) | 155.5 |
| | Ethyl acetate | 8.2 |
| | Portion 2 | |
| | Dinonylnaphthalene disulfonic acid (40% in isobutanol) | 2.0 |
| | Portion 3 | |
| | Butylated isoadipoguanamine-formaldehyde resin (as prepared in Example 1) | 30.0 |
| | Total | 244.2 |

Charge Portion 1 into a stainless steel vessel and mix for 15 minutes. Add Portion 2 and continue the mixing for an additional 5 minutes. Then add and thoroughly mix in Portion 3.

Spray the coating composition thus prepared onto the desired substrate and bake for 30 minutes at 135° C.

I claim:

1. An improved coating composition of the kind having:
   (1) binder constituents consisting essentially of a film-forming material and a crosslinker for the film-forming material, wherein the film-forming material is selected from the group consisting of acrylic resins, polyester or alkyd resins, and epoxy resins, or mixtures of these, and
   (2) a solvent for the binder constituents, wherein the improvement is characterized in that the crosslinker for the film-forming material is an alkylated isoadipoguanamine-formaldehyde resin consisting essentially of the reaction product of:
      (1) an isoadipoguanamine mixture consisting essentially of:
         (a) about 87-95 percent by weight, based on the weight of the isoadipoguanamine mixture, of 2-methylglutaroguanamine,
         (b) about 4-12 percent by weight, based on the weight of the isoadipoguanamine mixture, of 2-ethylsuccinoguanamine, and
         (c) about 1-2 percent by weight, based on the weight of the isoadipoguanamine mixture, of adipoguanamine;
      (2) from 3-6 moles of formaldehyde per mole of said isoadipoguanamine mixture; and
      (3) a stoichiometric excess of an aliphatic alcohol having 1-4 carbon atoms or of a mixture of such alcohols.

2. The improved coating composition of claim 1 which contains about 60-80 percent by weight, based on the weight of the binder constituents, of a film-forming material and 20-40 percent by weight of a crosslinker.

3. The improved coating composition of claim 1 wherein the film-forming material is a hydroxyl-functional polyester.

4. The improved coating composition of claim 3 wherein the film-forming material consists essentially of:
   (1) a polyester polyol that is the reaction of
      (a) neopentyl glycol and at least one other hindered diol containing two methylol groups wherein each methylol group is attached directly to a cycloaliphatic or aromatic structure or to a tertiary carbon atom, the molar ratio of neopentyl glycol to hindered diol being 2:1 to 6:1, and
      (b) a mixture of an aromatic and an aliphatic dicarboxylic acid wherein the molar ratio of aromatic acid to aliphatic acid is from 2:1 to 10:1,
   wherein the molar ratio of (a) to (b) is from 1.3:1 to 1.9:1 and wherein the polyol has a hydroxyl content of about 3.0-10.0% by weight; and
   (2) 0-50% by weight, based on the weight of (1), of an epichlorohydrin-bisphenol-A epoxy resin, or the esterification product of said resin with a monocarboxylic acid, or mixtures of these.

5. The improved coating composition of claim 1 wherein the film-forming material is a hydroxyl- or carboxyl-functional acrylic polymer.

6. The improved coating composition of claim 1 wherein the film-forming material is an epoxy resin derived from epichlorohydrin and bisphenol-A.

7. The improved coating composition of claims 3, 5, or 6 wherein the solvent for the binder constituents is present in an amount of no more than 100 percent by weight of the binder.

8. The improved coating composition of claims 1, 2, 3, 5, or 6 which contains, in addition to the aforementioned components, pigment in the amount of 0.1-60 percent by weight, based on the weight of the coating composition.

9. The improved coating composition of claims 1, 2, 3, 5, or 6 which contains, in addition to the aforementioned components, an ultraviolet light stabilizer, an antioxidant, or both.

* * * * *